June 4, 1968  H. O. KIRKPATRICK  3,386,260

HEAT EXCHANGERS

Filed Dec. 19, 1966  4 Sheets-Sheet 1

INVENTOR
Henry O. Kirkpatrick

BY *[signatures]*

ATTORNEYS

June 4, 1968  H. O. KIRKPATRICK  3,386,260
HEAT EXCHANGERS
Filed Dec. 19, 1966  4 Sheets-Sheet 2
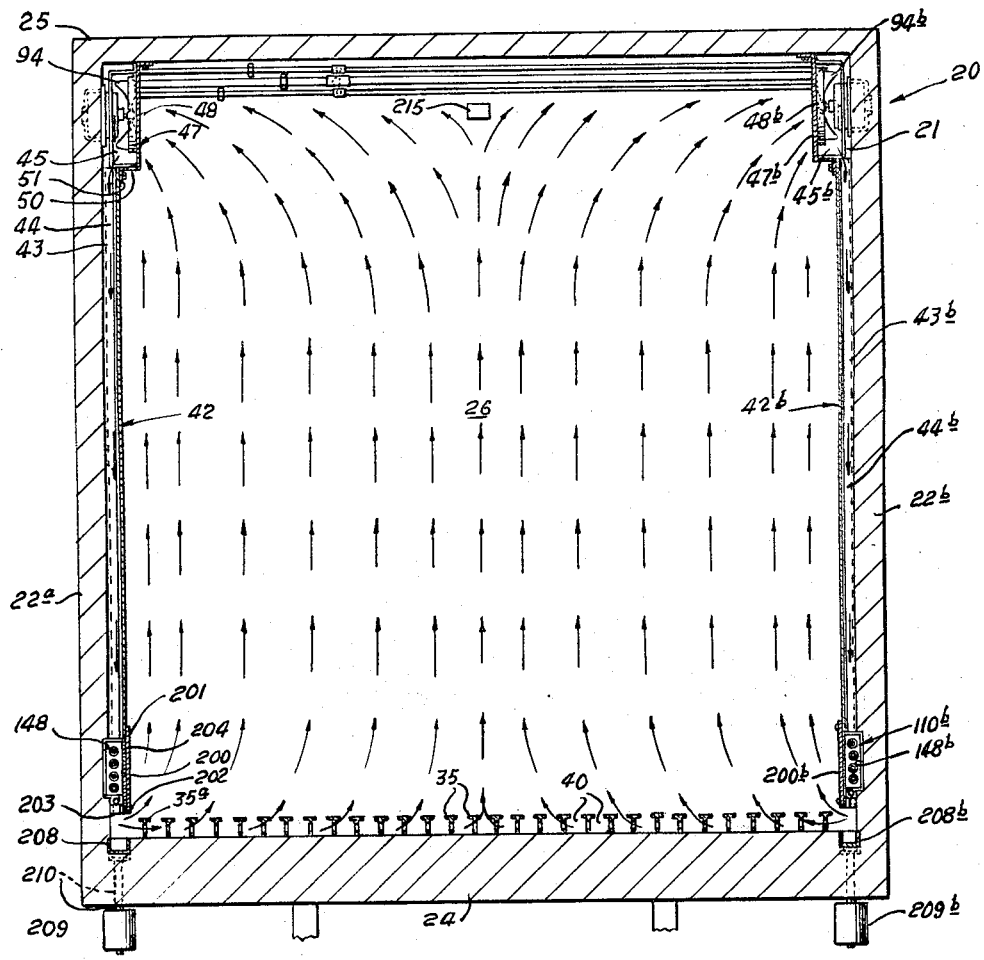
Fig. 2
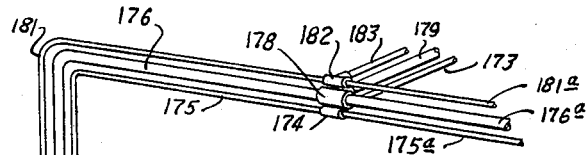
Fig. 3
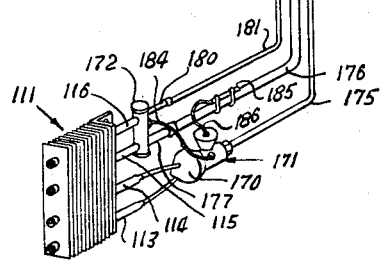
INVENTOR
Henry O. Kirkpatrick
BY
ATTORNEYS June 4, 1968  H. O. KIRKPATRICK  3,386,260
HEAT EXCHANGERS
Filed Dec. 19, 1966  4 Sheets-Sheet 3

INVENTOR
Henry O. Kirkpatrick
BY
ATTORNEYS

June 4, 1968     H. O. KIRKPATRICK     3,386,260
HEAT EXCHANGERS
Filed Dec. 19, 1966     4 Sheets-Sheet 4
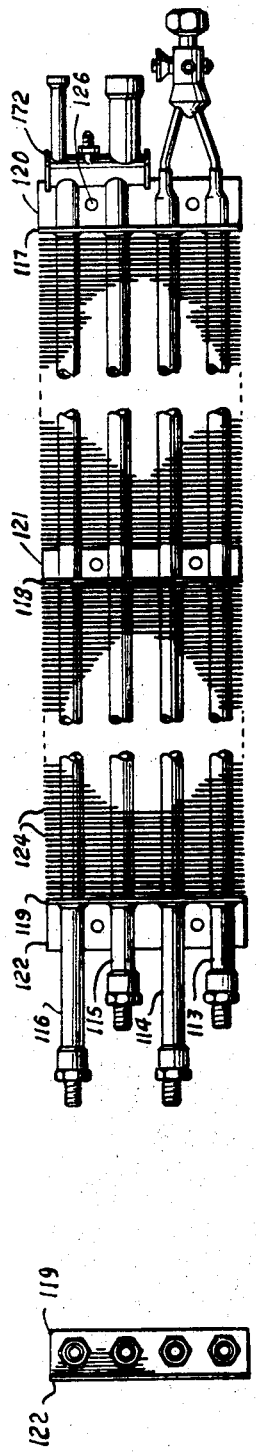
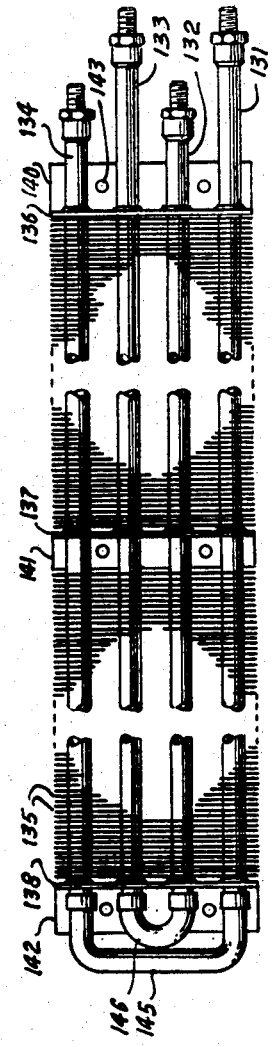
INVENTOR
Henry O. Kirkpatrick

United States Patent Office 3,386,260
Patented June 4, 1968

3,386,260
HEAT EXCHANGERS
Henry O. Kirkpatrick, Dallas, Tex., assignor to Cummins Engine Company, Inc., Columbus, Ind., a corporation of Indiana
Filed Dec. 19, 1966, Ser. No. 602,770
14 Claims. (Cl. 62—239)

This invention relates to apparatus for cooling air in a cargo chamber of a transport vehicle and circulating it through the cargo and to a transport vehicle having such apparatus.

An object of the invention is to provide a new and improved apparatus for circulating air within a cargo chamber of a vehicle and for cooling the air as it is circulated therethrough.

Another object is to provide an apparatus of the type described which minimizes the flow of cool air from the chamber and the flow of warm air into the chamber when the end doors of the vehicle are opened for loading or unloading of cargo.

Still another object is to provide a refrigeration apparatus for a vehicle which provides for circulation of air past evaporator assemblies mounted on longitudinal side walls of the vehicle, the evaporator assemblies extending substantially the full length of the vehicle, and for causing transverse circulation of the air within the chamber.

A further object is to provide a refrigeration apparatus for a vehicle which provides vertical passages along each side wall along substantially the full length of the side wall, means for moving air transversely outwardly from the top portion of the chamber to the top ends of the passages and downwardly through the passages past evaporator assemblies disposed below the passages back into the chamber along each side wall adjacent the bottom wall or bed of the vehicles.

Still another object is to provide a refrigeration apparatus of the type described wherein the vehicle is provided with means for holding the cargo spaced above the bed thereof and for permitting flow of the cooled air transversely inwardly from each side wall and beneath the cargo.

A still further object is to provide a refrigeration apparatus of the type described having a plenum extending longitudinally along each side wall at the top portion of the chamber into which the vertical passages open, the air moving means being disposed in the plenums.

A still further object is to provide a refrigeration apparatus wherein the plenums provide for substantially uniform rate of flow of air to all passages, the plenums being of substantially greater cross sectional areas than the passages.

Another object is to provide a refrigeration apparatus for a vehicle wherein the evaporator assemblies comprise coil sections having a plurality of vertical tubes through which a refrigerant fluid circulates through the substantially full length of the cargo chamber.

Still another object is to provide a refrigeration apparatus wherein the refrigerant fluid flowing through the expansion valve of each evaporator assembly first flows through the lower tubes of the coil sections and then to a section header of the apparatus through the upper tubes of the coil sections in order to provide a substantially uniform temperature gradient and optimum heat transfer from the air circulating past the coil sections and the refrigerant fluid flowing therethrough.

Additional objects and advantages of the invention will be readily apparent from the reading of the following description of a device constructed in accordance with the invention, and reference to the accompanying drawings thereof, wherein:

FIGURE 2 is a partly schematic sectional view taken on line 2—2 of FIGURE 1;

FIGURE 3 is a fragmentary schematic view showing the conduit means for conducting refrigerant fluid to and from the evaporator coils of the refrigeration apparatus;

FIGURE 8 is a side view of a front section of one of the evaporator coil assemblies;

FIGURE 9 is a rear end view of the coil assembly of FIGURE 8;

FIGURE 10 is a vertical view of a rear section of the evaporator coil assembly; and, FIGURE 11 is a side view showing the manner in which the tubes of two coil sections of each coil assembly are interconnected.

Figure 1:
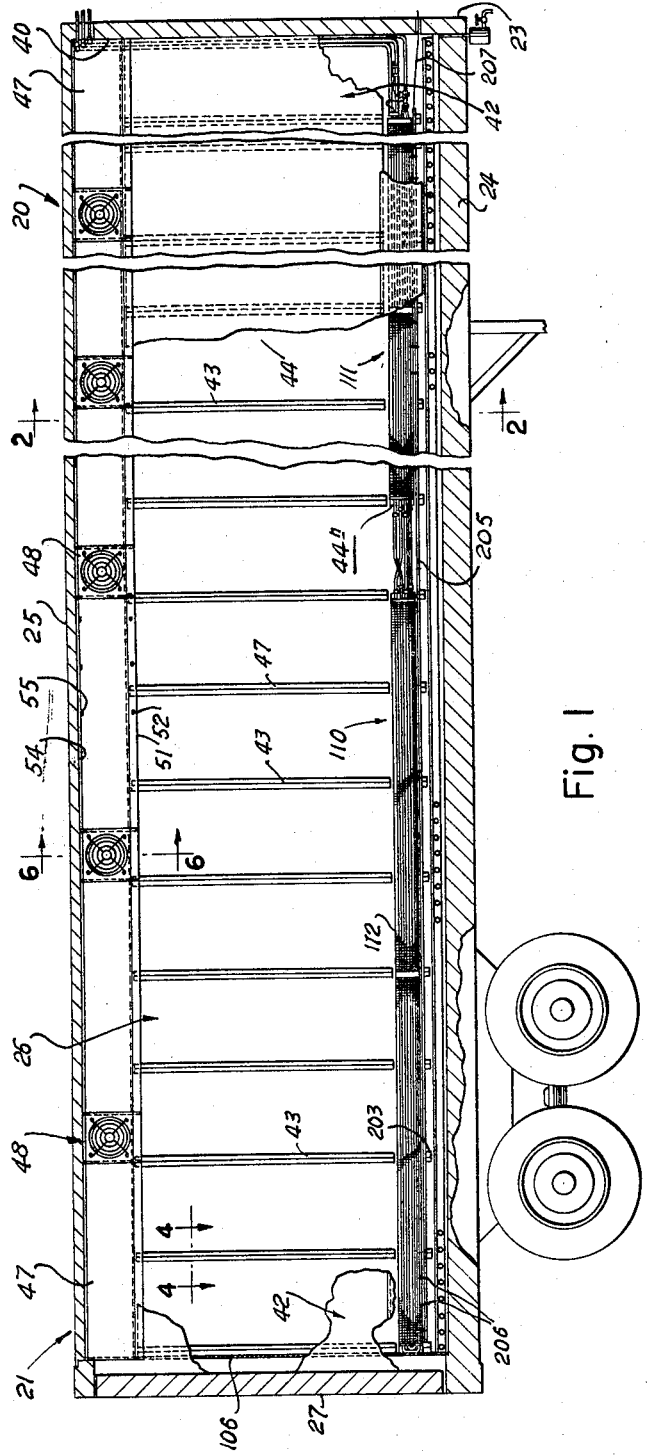
FIGURE 1 is a partly schematic vertical longitudinal sectional view, with some parts broken away of a trailer provided with the refrigeration apparatus embodying the invention.
Figure 5:
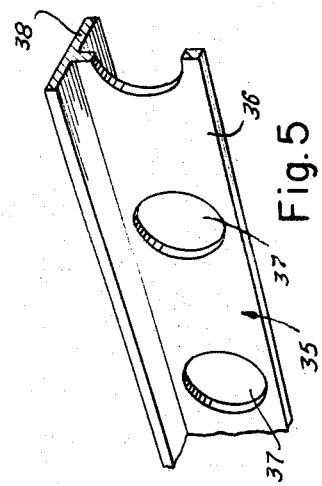
FIGURE 5 is a fragmentary perspective view of a load support runner of the vehicle.

Referring now to the drawings, the transport vehicle or trailer 20 provided with the refrigeration apparatus embodying the invention has a body 21 formed of a pair of longitudinal parallel side walls 22a and 22b, a front end wall 23, a bottom wall or bed 24, and a top wall or roof 25, which define a cargo carrying chamber or compartment 26. The trailer has the usual rear door or doors 27 which are movably secured to the side walls.

Figure 4:
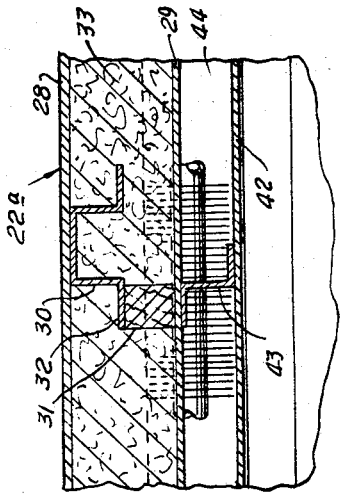
FIGURE 4 is an enlarged sectional view taken on line 4—4 of FIGURE 1.
Figure 6:
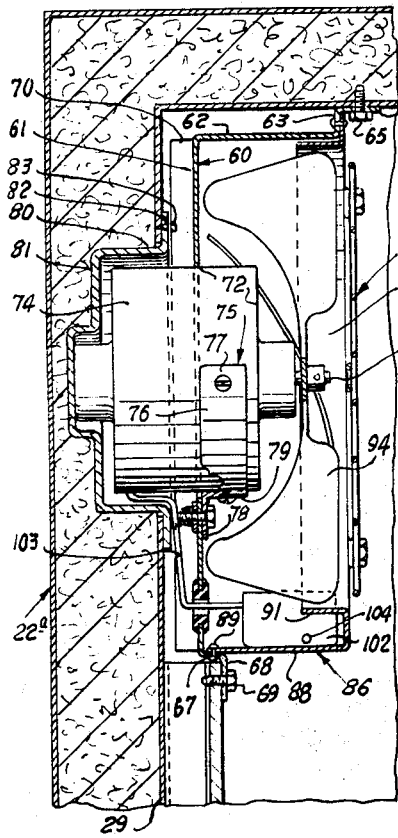
FIGURE 6 is an enlarged sectional view taken on line 6—6 of FIGURE 1.
Figure 7:
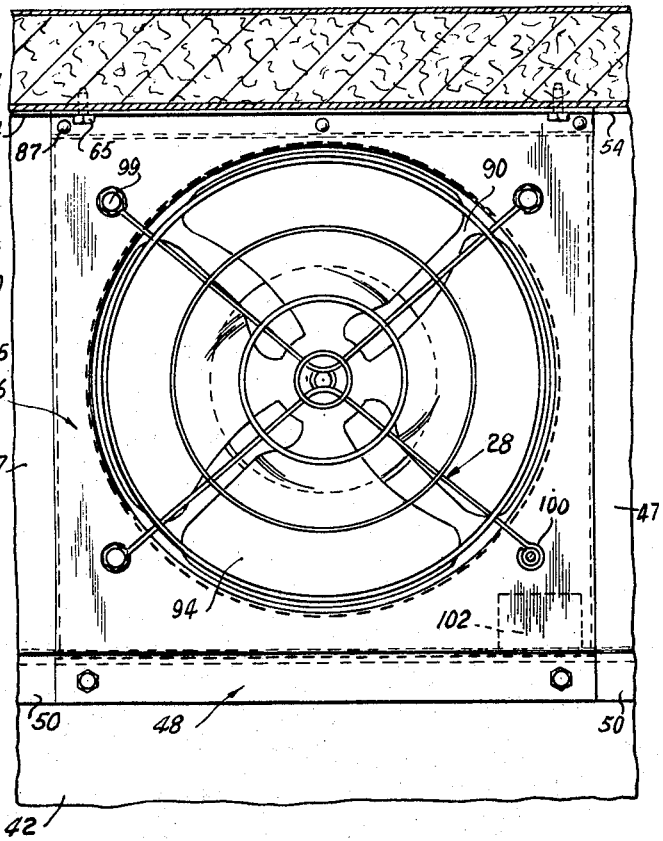
FIGURE 7 is a front view of the fan of FIGURE 6.

As is illustrated in FIGURE 4, the side wall 22a of the trailer may be formed of an outer metal plate 28 and an inner metal plate 29. The outer and inner wall plates are held in spaced relation by channel members 30 and vertical studs 31 of wood or other similar substance which is not a good heat conductor. The webs of the channel members abut the inner surface of the outer wall plate while the wood studs about the outer surface of the inner wall plate and the inner surfaces of the flanges 32 of the channel members. The channel members and the studs are secured to one another and to the outer and inner wall plates in any suitable manner, such as screws, riveting or the like. A suitable heat insulating substance 33, such as rock wool, fills the space between the outer and inner plates. The other walls of the trailer may be of the same structure to limit or minimize the conduction of heat through the walls into the compartment.

The bottom or bed 24 of the trailer has mounted thereon a plurality of transversely spaced longitudinally extending runners 35 which are rigidly secured to the bed in any suitable manner. The runners are substantially T-shaped in cross section having vertical leg portions 36 which are provided with apertures 37 and horizontal head portions 38 on which the cargo may rest. The heads of the runners are spaced to provide longitudinally extending passages 40 between adjacent runners.

An inner side wall 42 is secured in spaced relation to the side wall 22a by a plurality of vertical spaced partition bars 43 which are substantially Z-shaped in cross section having outer flanges which extend parallel to and are secured to the inner plate 29 of the wall 22a and outer flanges which extend parallel to and are secured to the inner wall 42. The partition bars 43, the inner wall and the side wall 22a thus provide vertical relatively narrow passages 44, for example one inch wide, along substantially the full length of the side wall 22a. The passages 44 open at their upper ends to an enlarged longitudinal passage or plenum 45 formed by a plurality of plenum plates 47 and fan assemblies 48. Each of the plenum plates has an outwardly offset dependent vertical flange 50 which overlaps the upper portion of the inner wall 42 and is secured thereto in any suitable manner, as by screws 52. Each of the plenum plates at its top end has a horizontal inwardly extending flange 54 which abuts the roof 25 and is secured thereto by means of screws or bolts 55.

The fan assemblies 48 are disposed between adjacent spaced ends of adjacent plates. Each of the fan assemblies includes a rectangular mount plate 60 having a vertical rectangular main body portion 61, a horizontal portion 62 which extends inwardly from the top edge of the body vertical portion 61, a vertical portion 63 which extends upwardly from the inner edge of the horizontal portion 62, and a horizontal top flange 64 which extends inwardly from the top edge of the top vertical portion 63. The horizontal top flange 64 engages the top wall 25 of the body and is secured thereto in any suitable means, as by screws 65. The main body portion 61 of the mount plate also has a bottom horizontal portion 67 from which extends a bottom vertical dependent flange 68 which overlaps the top edge of the inner wall 42 and is secured thereto in any suitable manner, as by screws 69. If desired, the mount plate may include vertical brace flanges 70 which may extend rearwardly from the side edges of the main body portion 61 to add strength and rigidity to the mount plate.

The motor mount plate has an aperture 72 which receives an electric motor 74 secured to the mount plate by a bracket 75. The bracket 75 has an arcuate portion 76, in which the motor is disposed and which is secured to the arcuate portion by any suitable means, such as screws 77, and a vertical bottom flange 78 which is secured to the main body portion of the mount plate by means of bolts 79.

The inner plate 29 of the side wall 22a of the vehicle has an aperture 80 at the location of each fan assembly in which is secured a well plate 81 to which extends the outer portion of the motor. The well plate 81 is provided with a peripheral annular flange 82 which abuts the inner plate 29, about its aperture 80 and is rigidly secured thereto in any suitable manner, as by screws 83.

The fan assembly includes an orifice plate 86 whose upper edge portion abuts the top vertical portion 63 of the mount plate and is secured thereto in any suitable manner, as by rivets 87. The orifice plate also has an outwardly extending bottom horizontal flange 88 whose outer edge portion rests on the bottom horizontal portion 67 of the mount plate and is secured thereto by rivets 89. The orifice plate has an orifice 90 defined by an inwardly extending annular flange 91 thereof into which extends a fan 94 rigidly mounted on the drive shaft 95 of the motor 74. A protective grill 98 extends over the orifice and is rigidly secured thereto by means of bolts 99 which extend through suitable hook portions 100 of radially outwardly extending members of the protective grill.

An outlet box 102 is mounted on the bottom horizontal flange 88 of the orifice plate in which are located the connections of the conductors of a two conductor cable 103 of the motor to the conductors of a two conductor main cable 104.

The main conductor, of course, extends from an external source of electric current to the outlet boxes of the fans.

It will thus be seen that the passages 44 open at their upper ends to the enlarged plenum, that air may be moved inwardly at longitudinally spaced locations into the plenum near the roof of the chamber and circulated downwardly through the passages 44 since the front end of the plenum is closed by the front wall 23 and the rear end of the plenum is closed by a suitable plate 106. An evaporator assembly 110 extends substantially the full length of the side wall 22a and is secured thereto immediately below the inner wall and the lower ends of the partition bars 44. The evaporator assembly 110 includes a plurality of sections, for example, a front coil section 111 and a rear coil section 112.

The front coil section may include four vertically spaced tubes 113, 114, 115 and 116 which extend through suitable aligned apertures in the lateral flanges 117, 118 and 119 of mount brackets 120, 121 and 122, respectively, and through suitable aligned apertures in the usual fins 124. The headers and the fins are press fitted on the tubes. The front coil section is removably securable to the inner plate 29 of the side wall 22a by screws or bolts 125 which extend through suitable screw or bolt apertures 126 of the mount plates which are located between the tubes so as to provide easy access to such screws or bolts. The rear coil section 112 similarly includes four tubes 131, 132, 133 and 134 which extend through aligned apertures of fins 135 and the lateral vertical flanges 136, 137 and 138 of the mount plates 140, 141 and 142. The front and rear mount plates 120 and 122 extend forwardly and rearwardly, respectively, from their flanges so as to provide easy access to the bolt or screw apertures 143. Preferably no fins are positioned on the portions of the the tubes at the middle mount plate 141 to provide access to the screw or bolt apertures and thus to the screws or bolts 125 by which the rear coil section is secured to the side wall 22b. The rear ends of the bottom and top tubes 131 and 134 of the rear section are connected by a substantially U-shaped connector tube 145 and the rear ends of the two middle tubes 132 and 133 thereof are connected by a similar connector tube 146.

The inner plate of the side wall 29 preferably is formed with a longitudinal recess 148 in which the outer portions of the evaporator assembly 110 are received in order that coil sections of standard widths may be employed and not project inwardly of the inner wall 42.

Figure 11:
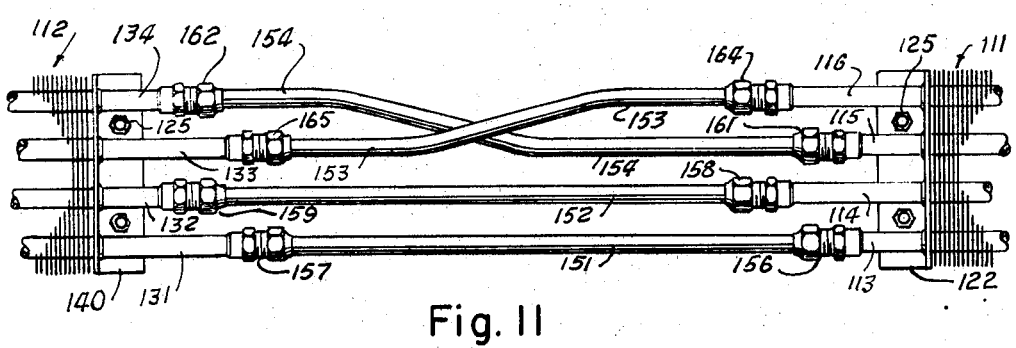

As illustrated in FIGURE 11, the tubes of the front and rear sections are connected by connector conduits or tubes 151, 152, 153 and 154. The rear end of the bottom tube 113 of the front coil section is connected to the front end by the conduit 131 and suitable fittings 156 and 157, the rear end of the tube 114 is connected to the front end of the tube 132 by the connector conduit 152 and fittings 158 and 159, the rear end of the tube 115 of the front coil section is connected to the front end of the top tube 134 of the rear coil section by the connector conduit 154 and the fittings 161 and 162, and the rear end of the top tube 116 of the front coil assembly is connected to the front end of the tube 133 of the rear coil assembly by the connector conduit 153 and the fittings 164 and 165.

The front ends of the bottom tubes 113 and 114 of the front coil section are connected to a distributor 170 of an expansion valve 171 and the front ends of its other two tubes 115 and 116 are connected to a suction header 172. Liquified and cooled refrigerant fluid from the receiver of a conventional refrigeration apparatus, which also includes a compressor and a condenser, is delivered to the inlet of the expansion valve through a conduit 173, a T-coupling 174 and a conduit 175. The refrigerant fluid from the suction header is transmitted to the inlet of the compressor through a conduit 176 connected to one outlet 177 of the suction header, a T-coupling 178 and a conduit 179. The suction header also has a second outlet 180 to which may be connected a bypass means, which may include a conduit 181, a T-coupling 182 and a conduit 183, as well as other conduit and valve means, not shown, which provides for unloading of the compressor by bypassing a controlled portion of the hot compressed gas from the compressor outlet to the suction header. This bypass means being well known to those skilled in the art will not be described in greater detail. The compressor, condenser, receiver and associated control means are mounted in a suitable housing (not shown) which may be mounted at a suitable location, as on the front wall of the body. The pressure at the suction or downstream end of the coil is communicated to a control means of the expansion valve through a conduit 184 also connected to the suction header. The temperature of the refrigerant fluid as it leaves the suction header is sensed by a usual temperature bulb 185 secured to the conduit 176 and connected to the expansion valve by a conduit 186. The expansion valve whose operation is responsive both to the pressure and temperature of the refrigerant fluid at the downstream or exhaust end of an evaporator being well known will not be described further. The T-couplings 174, 178 and 182 preferably are positioned adjacent the top of the front wall and the conduits 173, 179 and 183 extend to the exterior of the body through suitable apertures in the front end wall 23. The conduits 175, 176 and 181 are secured by suitable brackets to the front wall and extend along the front wall, and through suitable apertures in the front plenum plate 47a into the front passage 44a and then along the side wall 22a to the front end of the front coil sections.

It will be apparent that liquified and cooled refrigerant fluid flows to the expansion valve and then rearwardly through the two lower tubes 113 and 114 of the front coil section and the two lower tubes 131 and 132 of the rear coil section. The fluid then flows forwardly through the upper tubes of the rear coil section and the two upper tubes of the front coil section. The refrigerant fluid flowing from the tube 134 of the rear coil section flows to the second highest tube 115 of the front coil section and the fluid from the tube of the second highest tube 133 of the rear coil section flows to the top tube 116 of the front coil section in order that an optimum temperature gradient be maintained between the refrigerant fluid and the air being circulated past the tubes of the coil sections at all locations along the tubes of the coil sections and thus provide most efficient transfer of heat from the air to the refrigerant fluid as the air is circulated downwardly through the passages 44 and through the evaporator assembly.

A cover plate 200 overlaps the bottom edge portion of the inner wall 42 and is secured at its upper head portion to the inner wall and to the partition bars 43 by means of screws 201 and along its lower edge by screws 202 which extend into brackets 203 secured to the wall 22a below the recess 148 and preferably in alignment with the partition bars 43. The cover plate is preferably of scuff resistant substance, such as metal, and has secured thereto in any suitable manner an inner layer or sheet 204 of an insulating substance to prevent transfer of heat through the cover plate.

It will be apparent that the cover plate 200 constitutes a downward extension of the inner wall 42 and that its lower bottom edge is located just above the heads of the runners 35.

An electric heater 205 may be mounted by a means of suitable clamps or brackets 206 to the coil sections of the assembly 110. The electric heater extends substantially the full length of the evaporator assembly and when it is desired to defrost the evaporator assembly, the heater is energized by electric current from a suitable source located externally of the body and which is transmitted thereto by means of a suitable cable 207. When the heater is energized, the heat generated thereby causes any frost and ice present on the coil sections to be melted. The water flows downwardly from the coil sections to a trough 208 positioned below the evaporator assembly. A container 209 is connected to a lower end of a pipe 210 secured to the body whose upper end is connected to the forward lowermost end of the forwardly sloping trough 208. The container may be provided with a suitable valve through which its contents may be emptied as required. If desired, the trough could be omitted and the wall 22a and the runner 35a closest to the side wall 22a would, with the body bed, constitute a trough.

It will be apparent that since the evaporator assembly is mounted at the lower end of the inner wall, any water produced by the melting of frost or ice present on the evaporator assembly has only a short distance to flow to reach the trough 208 and thus will not tend to refreeze on the walls. If the evaporator assembly were located at the upper end of the wall, such water flowing from the evaporator assembly could refreeze in the narrow passages 44 before reaching the trough 208.

It will further be seen that the location of the evaporator assembly adjacent the bed of the trailer body permits easy access to the evaporator assembly in the event repair or service thereof is necessary.

The side wall 22b similarly is provided with an evaporator assembly 200b, an inner wall 42b, a plenum 45b, and fan assemblies 48b which are similar in structure to the evaporator assembly 200, the inner wall 42, the plenum 45, and the fan assemblies 48, and, accordingly, the elements of the apparatus mounted on the wall 22b have been provided with the same reference numbers, to which the subscript "b" has been added, as the corresponding elements of the apparatus mounted on the wall 22a.

Cooled and liquified refrigerant fluid is supplied simultaneously to the evaporator assemblies 200 and 200b through the conduit 173 since it is connected to the conduits 175 and 175a by the coupling 174, and evaporated refrigerant fluid from the suction headers of the two assemblies is transmitted to the compressor through the conduit 179 since the conduits 176 and 176a are connected thereto by the T-coupling 178. The operation of the compressor of the apparatus is, of course, controlled by a usual thermostat 215 mounted in a suitable location within the chamber 26.

In use, the cargo is supported by the runners 35 above the bed 24 of the vehicle body so that their apertures provide passages through which the air may move transversely beneath the cargo and adjacent runners provide longitudinal passage through which the air may move upwardly and then through interstices in the cargo.

In use, liquified and cooled refrigerant fluid is supplied through the conduit 173 from an external source, such as a receiver of a usual refrigeration system or apparatus, to the conduit 175 and thus to the expansion valves of the two evaporator assemblies. The refrigerant fluid evaporates as it flows through the tubes of the coil sections of the two evaporator assemblies and absorbs heat from the air flowing downwardly past the coil sections. The motors of the fan assemblies are energized and the fans of the fan assemblies 48 and 48b move air from the top of the chamber 26 into the plenums 45 and 45b at each side wall of the body and then downwardly through the passages 44 and 44b through the coil sections and then below the bottom edges of the two cover plates 200 and 200b. The air then flows transversely inwardly from each inner wall beneath any cargo resting on the runners through the apertures of the runners and then upwardly through the longitudinal passages 40 beneath the cargo. The air then flows upwardly, as illustrated in FIGURE 2, through the cargo and then transversely laterally outwardly toward the fan assemblies. A pair of substantially tubular circulation paths or cells of air flow are thus established. The air flowing in these circulation paths does not tend to flow longitudinally through the chamber due to the provision of the longitudinally spaced fan assemblies which cause air to be drawn into the plenum at longitudinally spaced locations along the side walls. As a result even if the door to the body is open, there is no tendency for the fans to draw outside air into the chamber or move air from the chamber outwardly through the door. It will further be seen that since the inner walls and the evaporator coil sections extend substantially the full length of the body at each side wall thereof a substantially uniform circulation of air and substantially uniform temperature conditions are maintained throughout the full chamber.

It will further be seen that while the first or front passage 44 of each side wall does not have evaporator coil sections therebelow, the width of such front section is relatively short and air moving downwardly therethrough has previously been cooled by passing through the front coil section due to the mixing of the air as it is drawn into the plenum by the fan of the front fan assembly. The bypass conduits 181 and 181b, if they are provided and used, are, of course, insulated to prevent transfer of heat from the refrigerant gas flowing therethrough to the air being circulated in such front passages.

It will further be seen that while the connector conduits 151-154 are shown as not provided with the cooling fins these can be provided if desired. However, if no fins are provided on these connector cables a substantially uniform rate of flow of air through all passages 44 will take place since the extreme relatively narrow widths of the passages tend to maintain the same conditions of flow through each one.

It will further be apparent that since the plenum means, such as the plates 47 and 47b and the fan assemblies 48 and 48b, which form the plenums or passages 45 and 45b extend a relatively short distance into the chamber inwardly of the inner walls at the top portion of the chamber, and since the passages 44 are very narrow, the effective cargo carrying capacity of the vehicle is not substantially decreased by the provision of the apparatus described. The plenums, since they are of greater width than the passages 44, provide for substantially uniform rates of flow of air through the restricted passage 44.

It will further be seen that the fan assemblies themselves constitute sections of the means forming the plenums and that they are easily and quickly mountable on a vehicle body to provide the desired circulation of air throughout the chamber.

It will further be seen that the motors of the fan assemblies themselves are recessed in wells of the inner walls and are located in the plenums.

It will further be seen that the evaporator assemblies themselves are relatively thin, are easily mountable on the walls, and are accessible for service and repair merely by the removal of the cover plates 200 and 200b.

It will further be seen that by mounting of the evaporator assemblies adjacent the bed of the vehicle body, any defrosting of the coil sections, whether by an electric heater as illustrated in the drawings or by circulating hot refrigerant fluid through the tubes of the evaporator sections, which results in the flow of water off the coil sections, requires that the water flow downwardly only a very short distance between the side walls and the lower portions of the cover plates before reaching the trough so that defrosting operations can be performed quickly and efficiently with the introduction of only a minimum quantity of heat into the chamber.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A vehicle including: a body providing an elongate chamber for holding cargo, said body having top, bottom, side and end walls; a plurality of longitudinal transversely spaced runners on said bottom wall for holding cargo in said chamber spaced above said bottom wall, said runners having transverse apertures therethrough to permit flow of air transversely in said chamber below said cargo supported by said runners; an inner wall on each of said side walls extending substantially the full length of each of said side walls; means between said inner walls and said side walls securing said inner walls to said side walls in spaced relation thereto to provide vertical passages; said inner walls being spaced from said bottom and top walls; an evaporator assembly secured to each of said side walls; a cover plate secured to each of said side walls constituting a downward extension of said inner walls and covering said evaporator assemblies, said passages opening downwardly above said evaporator assemblies; plenum means providing a longitudinal plenum at the upper end of each inner wall of greater width than said passages, said plenums extending longitudinally substantially the full length of said side walls adjacent said top wall of said body, said passages opening upwardly into said plenums; and a plurality of longitudinally spaced air moving means for drawing air transversely outwardly from the upper portion of said chamber into said plenums and moving the air downwardly through said passages past said evaporator assemblies, and into the chamber adjacent said bottom wall.

2. The vehicle of claim 1, wherein the bottom edges of said cover plates are adjacent to and spaced above said runners whereby the air moved by said air moving means past said evaporator assemblies flows downwardly past the bottom edges of said cover plates and transversely inwardly into said chamber.

3. The vehicle of claim 1, wherein each of said plenum means includes a plurality of plenum plates secured to said inner walls at their bottom ends and to said top wall at their upper ends, said air moving means comprising a plurality of fan assemblies spaced longitudinally along said side walls and disposed between spaced ends of adjacent plenum plates.

4. The vehicle of claim 3, wherein each of said fan assemblies includes an orifice plate having an aperture communicating with the plenum and the chamber, a motor disposed in said plenum and a fan driven by said motor for moving air from the chamber into the plenum through said aperture.

5. The vehicle of claim 4, wherein said side wall at the location of each fan assembly has a recess, said motor extending into said recess.

6. The vehicle of claim 5, wherein said side walls are provided with longitudinal recesses in alignment with said cover plates, said evaporator assemblies having outer portions disposed in said longitudinal recesses.

7. The vehicle of claim 6, wherein each of said evaporator assemblies includes at least a front coil section and a rear coil section each having a plurality of vertically spaced tubes; connector conduits connecting the rear ends of the tubes of the front coil section with the front ends of said rear coil section, and means connecting the rear ends of lower tubes of the rear coil assembly with the rear ends of the upper tubes thereof.

8. The vehicle of claim 7, wherein said evaporator assembly includes an expansion valve having an outlet connected to the front ends of the lower tubes of the front coil section and a suction header connected to the front ends of the upper tubes of the front coil section whereby refrigerant fluid from the expansion valve flows rearwardly through the lower tubes of said coil section and forwardly through the upper tubes of the coil sections to said suction header, and conduit means for delivering liquid refrigerant to the said expansion valve and withdrawing refrigerant fluid from said suction header.

9. Apparatus for maintaining a predetermined temperature in a chamber of a structure wherein the chamber is defined by top, bottom, side, and end walls, said apparatus including: supporting means on the bottom wall of the structure for holding articles in the chamber spaced above the bottom wall, said support means providing for transverse and longitudinal flow of air in said chamber below the article supported by the supporting means and for upward flow of air past the articles; inner walls secured to the side walls spaced inwardly therefrom to provide vertical passages and extending substantially the full length of the side walls; said inner walls being spaced from the bottom and top walls; an evaporator assembly secured to each of the side walls; said vertical passages opening downwardly above said evaporator assemblies; plenum means providing a longitudinal plenum at the upper end of each inner wall of greater width than said passages, said plenum extending longitudinally substantially the full length of said side walls adjacent said top wall of said body, said passages opening upwardly into said plenum; and a plurality of longitudinally spaced air moving means for drawing air transversely outwardly from the upper portion of said chamber into said plenums and moving the air downwardly through said passages past said evaporator assemblies and into the chamber adjacent said bottom wall.

10. The apparatus of claim 9, wherein cover plates secured to said side walls constitute downward extension of said side walls and cover said evaporator assemblies, bottom edges of said cover plates being adjacent to and spaced above said supporting means whereby the air moved by said air moving past said evaporator assemblies flows downwardly past the bottom edges of said cover plates and transversely inwardly into said chamber.

11. The apparatus of claim 10 wherein each of said plenum means includes a plurality of plenum plates secured to said inner walls at their bottom ends and to said top wall at their upper ends, said air moving means comprising a plurality of fan assemblies spaced longitudinally along said side walls and disposed between said spaced ends of adjacent plenum plates.

12. The apparatus of claim 11, wherein each of said fan assemblies includes an orifice plate having an aperture communicating with the plenum and the chamber, a motor disposed in said plenum and a fan driven by said motor moving air from the chamber into the plenum through said aperture.

13. A vehicle including a body providing an elongate chamber for holding cargo, said body having top, bottom, side and end walls; support means on said bottom wall for holding said cargo in said chamber spaced above said bottom wall, said support means permitting flow of air transversely in said chamber below said cargo supported by said support means and upwardly through the cargo; an inner wall on each of said side walls extending substantially the full length of each of said side walls; means between said inner walls and said side walls securing said inner walls to said side walls in spaced relation thereto to provide vertical passage therebetween, said inner walls being spaced from said bottom and top walls; an evaporator assembly secured to each of said side walls, said passages opening downwardly above said evaporator assemblies; plenum means providing a longitudinal plenum at the upper end of each inner wall of greater width than said passages, said plenums extending longitudinally substantially the full length of said side walls adjacent said top wall of said body, said passages opening upwardly into said plenums; and a plurality of longitudinally spaced air moving means for drawing air transversely outwardly from the upper portion of said chamber into said plenums and moving the air downwardly through said passages past said evaporator assemblies and into the chamber adjacent said bottom wall.

14. The vehicle of claim 13, wherein said evaporator assemblies include cover plates secured to said side walls constituting downward extensions of said inner walls and covering said evaporator assemblies.

References Cited

UNITED STATES PATENTS

| | | | |
|---|---|---|---|
| 2,130,430 | 9/1938 | Maginnis | 62—414 X |
| 2,678,546 | 5/1954 | Campbell | 62—414 X |
| 2,882,701 | 4/1959 | Nelson | 62—419 X |
| 3,092,220 | 6/1963 | Black | 62—419 |
| 3,092,979 | 6/1963 | Lamont | 62—239 |
| 3,224,500 | 12/1965 | Bennett | 165—53 |
| 3,246,592 | 4/1966 | Roth | 62—239 X |

WILLIAM J. WYE, *Primary Examiner.*